Figure 1:
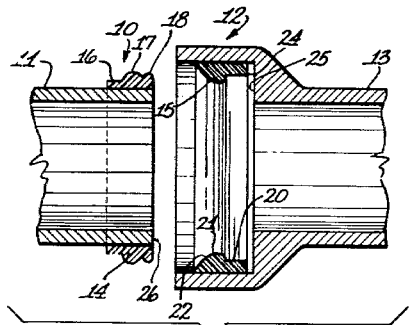

May 10, 1966 D. ALBON 3,250,538

JOINT FOR SEWER PIPES AND THE LIKE

Filed April 2, 1965

INVENTOR
Derek Albon
BY James A. Hamb
ATTORNEY

United States Patent Office 3,250,538
Patented May 10, 1966

3,250,538
JOINTS FOR SEWER PIPES AND THE LIKE
Derek Albon, Abbotsford, British Columbia, Canada, assignor to Clayburn-Harbison Ltd., Abbotsford, British Columbia, Canada
Filed Apr. 2, 1965, Ser. No. 444,987
2 Claims. (Cl. 277—24)

This is a continuation-in-part of United States patent application Serial No. 157,927, filed December 8, 1961, now abandoned.

This invention relates to improved joints for sewer pipes and the like, and in particular it relates to improved sealing means in bell and spigot pipe joints.

Sewer pipes and like pipe sections with which this invention is concerned usually have a spigot end and a bell or socket end. Two sections of pipe or, more simply, two pipes, are joined by a form of telescopic assembly, that is, by fitting the spigot end of one pipe into the bell end of another pipe which is substantially aligned and applying an axial force to move the spigot into the bell end. Some form of a seal is required between the adjacent surfaces of the two pipes to prevent leakage either outwards or inwards past the joint. One means of effecting a seal is by applying an adhesive material to the connecting portions of each pipe. The use of an adhesive seal has disadvantages. For example, the adhesive is not easy to apply to the surfaces in practice without having foreign matter included also, the adhesive does not always maintain a good seal if the pipes become misaligned, and it makes the joint difficult to disassemble.

Another means that has been used for effecting a seal in a spigot and bell type of joint is by using interfering sealing rings on both the spigot and the bell ends. These sealing rings have been made of polyvinyl chloride and other resilient thermoplastic materials. The sealing rings each have projections that engage with sealing surfaces on the other ring. That is, the bell end sealing ring, which is on the inner surface of the bell end, comprises an uninterrupted, annular, inwardly convex projection and a sealing surface having an inside diameter greater than the peak of the convex projection. The spigot end sealing ring, which is on the outer surface of the spigot end, comprises an uninterrupted, annular, outwardly convex projection and a sealing surface of lesser outside diameter than the peak of the convex projection. The projections and sealing surfaces are such that, when the spigot is fitted into the bell and pushed home, the projections deform and pass one another to be positioned on the sealing surface of the opposite sealing ring. When the joint is made there is interference between the spigot end sealing ring projection and the bell end sealing ring sealing surface, and also between the bell end sealing ring projection and the spigot end sealing ring sealing surface. This circumferential interference provides a double seal to prevent leakage at the joint.

The present invention is concerned with improvements to the aforementioned type of pipe joint using sealing rings. In making a joint of this type in practice, it is difficult to keep dirt and other foreign matter off the sealing rings. Often in practice, the pipe is assembled in a trench which may contain some muddy water or silt. In the construction of a pipeline, the pipe comprising the open end of the assembled pipeline is in the trench and the bell end is normally the open end. The next pipe is then lowered into the trench and its spigot end inserted into the bell end and pushed home. If the foreign matter on the sealing rings is not removed it would abrade the sealing surfaces and interfere with the seal in the joint. The prior art arrangement relies on the wiping action provided by the sealing projections to remove the foreign matter. That is, as each projection moves across the opposite projection and sealing surface, it is intended that it should sweep away all foreign matter. However, foreign matter can be caught and wedged between the sealing rings as the pipe ends are pushed together in the prior art pipe joint. This could scour and abrade the interfering surfaces and thus weaken the seal and eventually cause rupturing of the joint.

It should be noted that the amount of interference in the seal between a convex projection of one sealing ring and the sealing surface of the opposing ring may be very small. The amount of interference may vary considerably depending on pipe size, hardness, and the amount of residual compression needed between the sealing surfaces. However, as one example to illustrate the degree of interference that could be expected, a four inch pipe might have such an interference of the order of 0.017 inch (i.e., about 0.034 inch across the diameter of the pipe). It will be seen that the dimensions of an abrasion could be significant with respect to the amount of interference. Consequently, it is very desirable to reduce or eliminate the abrading of sealing surfaces.

It is another object of this invention to provide in a pipe joint having sealing rings, an improved means for removing foreign matter from the sealing rings as the joint is being made.

It is another object of this invention to provide in a pipe joint having coacting sealing rings, a resilient wiping lip on the spigot end sealing ring which wipes the sealing surfaces on the opposing sealing ring.

Figure 2:
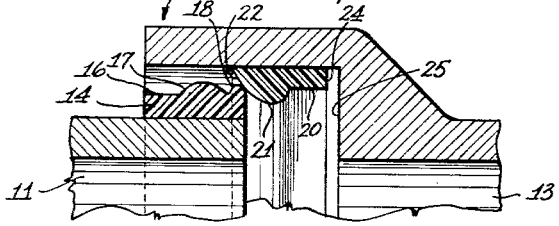
Figure 3:
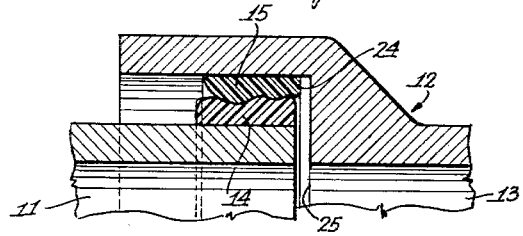
Figure 4:
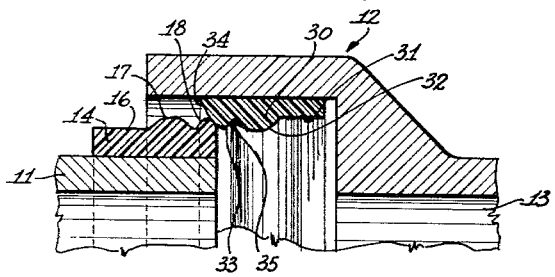

Other objects and advantages of this invention will be apparent from the following description taken in conjunction with the accompanying drawings in which, FIGURE 1 is a longitudinal sectional view of a spigot pipe end and a bell pipe end having annular sealing rings according to one embodiment of the invention, FIGURE 2 is an enlarged sectional view of a portion of the spigot pipe end and the bell pipe end, with sealing rings according to the FIGURE 1 embodiment of the invention, showing the pipe ends positioned for assembly, FIGURE 3 is an enlarged sectional view similar to FIGURE 2 but with the joint in the assembled position, and FIGURE 4 is an enlarged sectional view of a portion of a spigot pipe end and a bell pipe end having sealing rings according to another embodiment of the invention.

Briefly, the present invention provides on at least the sealing ring on the spigot end of a pipe in a pair of coacting sealing rings in a known type of bell and spigot pipe joint, a resilient wiping lip to wipe foreign matter from the joint-forming surface of the bell end sealing ring as the pipe ends are pushed together to form a joint.

Referring to FIGURES 1, 2 and 3, a spigot end 10 of a pipe 11 is shown in axial alignment with a bell end 12 of a pipe 13. The pipes 11 and 13 may be of any type that can be joined by a bell and spigot type of pipe joint. The pipes 11 and 13 are shown as conventional sewer pipes, and they may be made of the customary materials such as, for example, cement, clay, cast-iron, asbestos cement, tile, etc.

The pipe joint includes two annular sealing rings 14 and 15 secured to or bonded to their respective pipe sections 11 and 13. The sealing ring 14, on the outer surface of spigot end 10 of pipe 11, is an annular ring of resilient material comprising a cylindrical sealing surface 16, a convex projection 17, and a wiping lip 18 as shown. The maximum or outer diameter at the peak of convex projection 17 is greater than the outer diameter of sealing surface 16, and the convex projection 17 is located axially nearer the end 26 of pipe 11 than is the sealing surface 16. The maximum or outer diameter of the wiping lip 18 is greater than the diameter of the sealing surface 16, and the wiping lip 18 is located axially nearer the end 26 of pipe 11 than is projection 17. For economy of manufacture it is preferable to have the projection 17 and wiping lip 18 adjacent one another. In other words, the relative axial locations of the sealing surface 16, the projection 17, and the wiping lip 18 are as shown.

In most cases it is convenient to have the terminating face of the wiping lip 18 (that is the side closest the end 26 of pipe 11 which leads as the spigot end is inserted) substantially coextensive with the leading side of sealing ring 14 and with the end 26 of pipe 11. Having the front or leading side of the wiping lip 18 substantially coextensive with the leading side or edge of sealing ring 14 contributes to effective wiping as it reduces the possibility of dirt being trapped on the leading portion of the sealing ring 14. Two other factors contribute to an effective wiping action. The first of these other factors is making the sealing ring 14 so that the maximum or outer diameter of wiping lip 18 is equal to, or possibly slightly greater than, the outer diameter of projection 17. This ensures that any surface subsequently engaged by projection 17 will have been wiped by the wiping lip 18 during assembly. In other words, the joint-forming portion of sealing ring 15 is all wiped by lip 18. The second of these other factors is providing a wiping lip which has at least as much flexibility as projection 17. Inasmuch as wiping lip 18 and projection 17 are normally of the same material, this is achieved by having the axial dimension or width of wiping lip 18 no greater than, and preferably less than, the axial dimension or width of projection 17.

The sealing ring 15, on the inner surface of the bell end 12 of pipe 13, is an annular ring of resilient material comprising a cylindrical sealing surface 20, a convex projection 21, and a sloping lead-in surface 22. The inner diameter of the convex projection 21 is less than the inner diameter of the sealing surface 20, and the convex projection 21 is located axially nearer the open end of bell end 12 than is the sealing surface 20. The lead-in surface 22 slopes smoothly to the convex projection 21.

As was previously mentioned, in the forming of a pipe joint in practice, the completed or assembled pipe is frequently in a trench with the open end of the pipe being a bell end. The next pipe to be assembled is lowered into the trench with its spigot end towards the open bell end of the assembled pipe. The spigot end is inserted in the bell end and pushed home to form a joint. It will be apparent that even if the sealing rings are wiped prior to assembly there is more likelihood of foreign matter being on the sealing ring of the bell end than there is of foreign matter being on the sealing ring of the spigot end. Consequently the wiping lip 18 on the sealing ring 14 is provided to clean the foreign matter from the surface of the sealing ring 15 in the bell end of the joining pipe section during assembly.

The assembly of two pipes 11 and 13 to form a joint is best described with reference to FIGURES 2 and 3. FIGURE 2 shows a portion of pipes 11 and 13 in a sectional drawing as they would be just before the forming of a joint. The spigot end 10 is inserted into the bell end 12 until the wiping lip 18 engages the sloping lead-in surface 22. The lead-in surface 22 provides a self-aligning action, that is, it guides the spigot end 10 as it is moved inside the bell end 12 to a central position within the bell end 12. Thus the wiping lip 18 contacts the surface 22 at substantially the same place annularly around the surface 22. When the sealing rings 14 and 15 are so engaged, a force applied to move the pipe sections 11 and 13 together will form a joint.

As the spigot end 10 moves farther into the bell end 12, the wiping lip 18 deforms as it moves over projection 21 brushing or sweeping foreign matter ahead of it. There may also be some deformation of projection 21 as the lip 18 passes over it depending on the materials used in the sealing rings and the relative dimensions. The spigot end 10 continues to move farther into the bell end 12 and the wiping lip 18 sweeps foreign matter from the sealing surface 20 which has a constant diameter as shown for a smooth uninterrupted sweeping of its surface. At the same time the projections 17 and 21 deform and pass one another. The dimensions of projections 17 and 21 and the material from which they are made must, of course, be such that the projections will pass one another with a reasonable application of force. This is known in the art. When the projections 17 and 21 have passed one another, there is a sensation of positive locking action to indicate that a joint has been made.

If desired, a lubricant may be applied to the sealing rings prior to assembly to make the forming of the joint easier. It has been found that soapy water is a satisfactory lubricant in most cases.

FIGURE 3 shows the sealing rings 14 and 15 as they might appear when they are in a joint forming position. The projections 17 and 21 and the sealing surfaces 20 and 16 respectively must be so dimensioned that they are deformed by circumferential interference, that is by interference all around the circumference of the sealing rings, when the joint is formed to provide seals. The projection 17 interferes with wiped surface 20 to provide one seal, and the projection 21 which has also been wiped interferes with surface 16 to provide another seal. It will be apparent that an additional seal is provided by the wiping lip 18 of this invention interfering with the sealing surface 20.

It should be noted that, because the wiping lip 18 is at least of the same outer diameter as the outer diameter of projection 17, the projection 17 will engage the sloping lead-in surface 22 of sealing ring 15 at a point that has been wiped by wiping lip 18. Projection 17 does not contact unwiped parts of sealing ring 15. It should also be noted that, because the axial dimension of wiping lip 18 is no greater than (and preferably less than) the axial dimension of projection 17, the wiping lip 18 will have at least as much resilience or flexibility as projection 17 and will not tend to skip over dirt which lies on surface 20 immediately adjacent projection 21.

It will be seen in FIGURES 1, 2 and 3, that a space is provided between the inside edge 24 of sealing ring 15 and the butt edge 25 or shoulder 25 inside the bell end 12. This space will permit a certain degree of axial misalignment before the seal is weakened sufficiently to rupture. This is known in the art. As misalignment becomes greater the end 26 of spigot end 10 at some point around the pipe will get closer to butt edge 25 inside bell end 12. This will tend to slip the sealing rings 14 and 15 over one another and will weaken the seal. Further misalignment will bring end 26 into contact with edge 25 and result in a greater movement of the seals 14 and 15 over one another until the rings are separated at some point to break the seal.

Joints made in accordance with the present invention may be disassembled and reassembled without damage to the sealing rings. While a considerable force in a straight axial direction may be required to disassemble a joint, it is not difficult to separate two pipes, that is to disassemble a joint, by first misaligning the two pipes sufficiently to weaken or break the seal and then pulling the pipes apart.

It was previously pointed out that foreign matter must be wiped from the sealing ring on the inside of the bell end, and consequently a wiping lip is provided on the spigot end sealing ring. In another embodiment, shown in FIGURE 4, wiping lips are provided on both the sealing ring on the spigot end and on the sealing ring in the bell end.

Referring now to FIGURE 4, portions of pipes 11 and 13 are shown in a sectional drawing as they might appear just before the forming of a joint. The spigot end of pipe 11 has a sealing ring 14 bonded to its outer surface. The sealing ring 14 has a sealing surface 16, a convex projection 17, and a wiping lip 18 as described in connection with the previous embodiment. The sealing ring inside the bell end is, however, not the same as in the previous embodiment because a wiping lip has been added to it. The bell end 12 has a sealing ring 30 on its inner surface, and the sealing ring 30 is provided with a sealing surface 31, a convex projection 32, and a wiping lip 33. A lead-in surface 34 slopes smoothly from the inner bell end surface to the lip 33. The sealing surface 31 and the projection 32 are the same as surface 20 and projection 21, respectively, of the previously described embodiment, and their action is the same. The wiping lip 33 is provided to wipe foreign matter from the surface of sealing ring 14 as the joint is made. It is believed that no further description is necessary for an understanding of the FIGURE 4 embodiment.

It should be noted that the FIGURE 4 embodiment is not a preferred embodiment. While it provides another seal for the joint, it is possible for foreign matter to lodge in depression 35 between projection 32 and wiping lip 33. The wiping lip 18 may not dislodge all such foreign matter trapped in depression 35 and this could result in a scouring of the sealing surfaces of the sealing ring 14. Consequently the embodiment of FIGURES 1, 2 and 3 is preferred. While the FIGURE 4 embodiment is not preferred, it still offers some advantage over the prior art in situations where foreign matter is not likely to lodge in depression 35 or where such foreign matter can be removed. The wiping lips 18 and 33 still serve to wipe the surfaces 31 and 16 respectively.

Returning for a moment to the embodiment of FIGURES 1, 2 and 3, there is also a depression here between projection 17 and wiping lip 18. However, the possibility of foreign matter being trapped in this depression does not present a great problem. There appears to be two main reasons for this. One reason is that the spigot end is perhaps not subjected to so much foreign matter because of the manner of assembling the pipes in practice. As was previously described, when the pipe is being laid, it is usual to have a pipe with an open bell end lying on sand or earth and sometimes partly in water waiting to receive the next pipe. The next pipe section is lowered into position and the spigot end fitted into the bell end. Because the spigot end does not usually lie in the trench for any length of time prior to assembly, there is less possibility of foreign matter being picked up. Another reason is that the physical configuration of the spigot end sealing ring makes it less likely to retain foreign matter. That is, the bell end sealing ring 15 at the bottom forms a shallow pocket because of the upwardly curving parts of the ring from the bottom and projection 21 and this is likely to catch falling foreign matter and retain it. On the other hand, foreign matter falling on sealing ring 14 will tend to be dislodged by gravity as the pipe is moved into position for assembly. There is no pocket or hollow formed by the depression between projection 17 and wiping lip 18, because there is nothing to retain foreign matter at the sides. This would also hold true for the FIGURE 4 embodiment.

Although the convex projections and wiping lips have been shown as having a uniform convex shape, it will be apparent to those skilled in the art that other shapes will operate satisfactorily to provide one or more of the advantages of this invention.

The coacting sealing rings of the prior art have been made of thermoplastic elastomers such as polyvinyl chloride. These materials are not preferred for use in the present invention for the reasons set forth below.

The thermoplastic materials used in the prior art to form sealing rings usually require an application of heat of 300° to 500° F. for curing the material once it is applied to the pipe by means of a mould. The necessity for the application of heat to effect a cure is a considerable disadvantage in practice. Further, prior art thermoplastic elastomers were not satisfactorily stable in both volume and hardness over a wide temperature range.

Also, certain fillers used in the prior art thermoplastic materials, for example, barium sulphate and calcium carbonate, can be leached out by the action of soil acids under certain conditions.

The preferred material for sealing rings in pipe joints according to this invention is a cold setting, resilient, deformable polyurethane elastomer. This preferred material is injected or poured into suitable moulds on the spigot end and bell end of a pipe and it sets to a resilient, deformable plastic that is bonded to the pipe surface. Although the material will set or cure to a specific Shore hardness without application of heat, temperatures between 70° and 150° F. are required for fast cures. The cured polyurethane elastomer is not attacked by acids, alkalis or bacteria, it has a high resistance to mechanical shock, and is relatively stable in both volume and hardness over a wide temperature range. A clay filler that is inert may be used in the elastomer.

A polyurethane elastomer suitable for sealing rings in pipe joints can be made by reacting the two components given below which solidify without application of heat. The first component is a filled polyether containing free hydroxyls processed for use with isocyanates to give a polyurethane end product. This component is processed to remove all water. The second component is a polyether tolyene di-isocyanate prepolymer containing excess isocyanate. This is a clear liquid having a low viscosity. The solid polyurethane elastomer is formed by the reaction of the excess isocyanate of the second component with the hydroxyl group of the first component. Thus, the basic chemical reaction is believed to be:

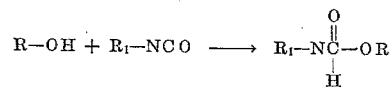

where the first component comprises a filled polyether R and a free hydroxyl OH, and the second component comprises a polyether tolyene di-isocyanate $R_1$ with an excess isocyanate NCO.

The reaction of the two components may be accelerated by the addition of certain catalytic materials to the first component prior to mixing. Organo metallic salts such as tin, lead and copper naphthenates and octoates are suitable. An example of proportions that will give satisfactory results is:

| | Parts by weight |
|---|---|
| First component | 89.4 |
| Lead naphthenate | 0.4 |
| Stannous octoate | 0.2 |
| Second component | 10.6 |

It has been found, by way of example, that a satisfactory way to prepare the joint seals is by using pressure tanks to store the components, a means to meter the output from the tanks, a mixing head in which to mix the components, and a dispensing nozzle to fill the moulds on the pipes. The components are stored in two tanks under a pressure of about 30 p.s.i. The air in the tanks must be dry and it can be passed through calcium chloride or other drying agency before being used to pressurize the tanks. It should be noted that one gram of water in 100 lbs. of the resulting mix will increase the demould time (that is will increase the length of time until the mould can be removed) by approximately fifteen minutes.

The two components are fed separately, under pressure, to two positive displacement gear pumps. The pumps have a common driving gear and the ratio of the two pumping rates can be altered by changing the size of the driven gear on the pumps. The metered amounts of the two components are then fed into a mixing head where the materials are intimately mixed by a series of paddles rotating in the head. The mixing head may comprise a cylinder of the order of 3″ diameter and 3″ length. As the reaction takes place heat is generated and it is necessary to water cool the mixing head for continuous operation. The polyurethane begins to gel about 30 seconds after the two components are mixed and it is important to keep the material moving through the mixing head. If the pumps are switched off for about a minute or longer, the mixing head should be flushed with a solvent to prevent the polyurethane forming around the paddles.

The material passes from the mixing head through a dispensing nozzle which can direct the material into suitable moulds placed on the bell and spigot ends of the pipes to form the sealing rings. It is convenient to have both a shut-off valve and an on-off switch on the dispensing nozzle to control both the flow and the metering pumps.

Sealing rings made of polyurethane possess an additional advantage over rings made with prior art thermoplastic materials. With the passage of time a polar attraction appears to set up between the interlocking surfaces of the sealing rings. This is not a chemical interaction of the urethane but appears to be a physical adhesion which forms a flexible resilient monolithic type of joint which resists leakage past the joint under severe conditions of misalignment and subsidence.

I claim:

1. In a pipe joint for joining a bell end of one pipe with a spigot end of another pipe,
    an annular resilient sealing ring bonded to the inner surface of said bell end comprising a cylindrical portion having an inwardly facing sealing surface of a first predetermined diameter and an annular convex projection integral therewith having an inner diameter less than said first predetermined diameter,
    said convex projection on said bell end being located axially nearer the end of the pipe of the bell end than said cylindrical portion,
    an annular resilient sealing ring bonded to the outer surface of said spigot end comprising a cylindrical portion having an outwardly facing sealing surface of a second predetermined diameter, an annular wiping lip, and an intermediate convex annular projection adjacent said wiping lip and integral with both said cylindrical portion and said wiping lip,
    said sealing ring on said spigot end having the wiping lip thereof on the side of the sealing ring adjacent the end of the pipe and the cylindrical portion thereof on the side remote from the end of the pipe,
    the dimensions of said sealing rings and the resilient material thereof permitting said projections to deform and push past one another as the spigot end is pushed into the bell end to form a joint with the bell end convex projection in sealing engagement with the sealing surface of the spigot end sealing ring and the spigot end convex projection in sealing engagement with the sealing surface of the bell end sealing ring,
    said wiping lip having a terminating end face substantially coextensive with the end of the sealing ring, and having an outer diameter greater than said first predetermined diameter and not less than the outer diameter of the convex projection on the spigot end sealing ring and having a maximum axial extent less than the maximum axial extent of the convex projection on the spigot end sealing ring for wiping engagement of the joint-forming portion of the convex projection and the sealing surface on the bell end sealing ring as the spigot end is pushed into the bell end to form a joint.

2. In a pipe joint for joining a bell end of one pipe with a spigot end of another pipe,
    an annular resilient sealing ring bonded to the inner surface of said bell end comprising a cylindrical portion having an inwardly facing sealing surface of a first predetermined constant diameter and an annular convex projection integral therewith having an inner diameter less than said first predetermined diameter,
    said convex projection on the bell end sealing ring being located axially nearer the end of the pipe in the bell end than said cylindrical portion,
    an annular resilient sealing ring bonded to the outer surface of said spigot end and comprising a cylindrical portion having an outwardly facing sealing surface of a second predetermined constant diameter, an annular wiping lip, and an intermediate convex projection adjacent said wiping lip and integral with both said cylindrical portion and said wiping lip,
    said sealing ring on said spigot end having the wiping lip on the side of the sealing ring adjacent the end of the pipe and the cylindrical portion on the side of the sealing ring remote from the end of the pipe,
    the resilient material of said sealing rings permitting said convex projections to deform and push past one another as the spigot end is pushed into the bell end, the diameter of the convex projection on the bell end sealing ring being slightly less than said second diameter and the diameter of the convex projection on the spigot end sealing ring being slightly greater than said first diameter to effect sealing engagement therebetween as the spigot end is pushed into the bell end,
    said wiping lip having a terminating end face coextensive with both the end of the sealing ring and the end of the pipe, and having an outer diameter equal to the outer diameter of the convex projection on the spigot end sealing ring and a maximum axial extent less than the maximum axial extent of the convex projection on the spigot end sealing ring for wiping engagement between said wiping lip and the joint-forming portion of the convex projection and sealing surface on the bell end sealing ring as the spigot end is pushed into the bell end to form a joint.

References Cited by the Examiner

UNITED STATES PATENTS

| | | | |
|---|---|---|---|
| 2,889,582 | 6/1959 | Cooper | 277—207 X |
| 3,054,627 | 9/1962 | Ligon | 277—11 |
| 3,124,367 | 3/1964 | Kaynor | 277—207 X |

FOREIGN PATENTS 217,685  10/1958  Australia.

SAMUEL ROTHBERG, *Primary Examiner.*